United States Patent Office 3,309,455
Patented Mar. 14, 1967

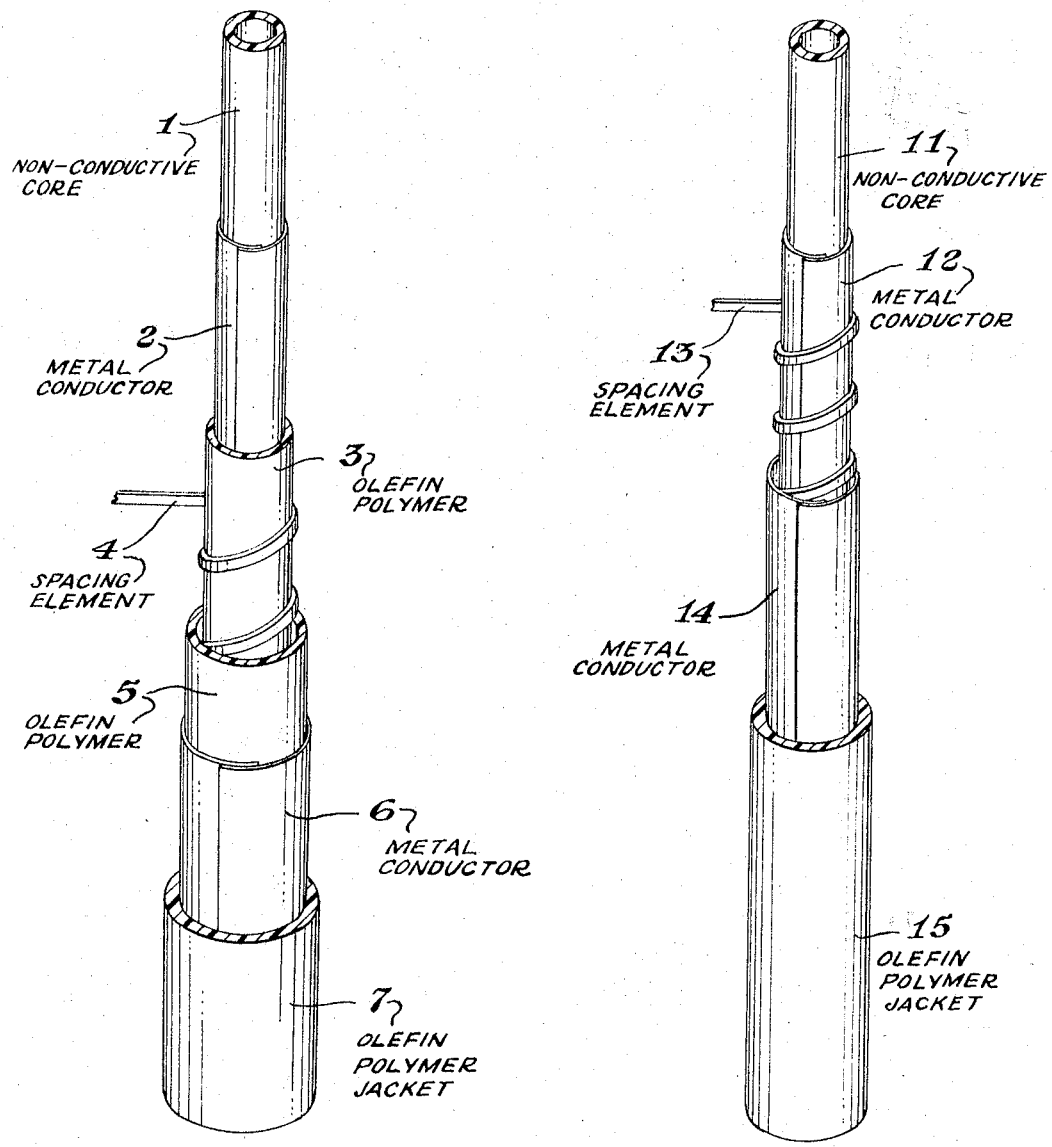

3,309,455
COAXIAL CABLE WITH INSULATING CONDUCTOR SUPPORTING LAYERS BONDED TO THE CONDUCTORS
Raymond C. Mildner, Midland, Mich., assignor to The Dow Chemical Company, Midland, Mich., a corporation of Delaware
Filed Sept. 21, 1964, Ser. No. 397,707
15 Claims. (Cl. 174—29)

The present invention relates to cables for transmitting high frequency currents. More particularly, it relates to cables having concentrically spaced conductors with air spaced insulation therebetween.

It is well known that high frequency signaling currents used in concentric conductor cable circuits are subject to "skin effect," that is to say the currents are largely confined to those surface layers of the two conductors forming a circuit which are nearest together, the proportion of the total current carried by a specified thickness of the conductor being dependent upon the current frequency, and on the dimensions and electrical properties of the conductors. Therefore, in the case of coaxial cables in which both the main and return conductors are coaxial cylinders, only the outermost skin of the inner conductor and the innermost skin of the outer conductors are useful in the transmission of high frequency energy along the cable. For efficiency and transmission of current through the above-mentioned types of cable, it is necessary that an insulation having a low dielectric constant be used to separate the inner and outer conductors. Also, since the "skin effect" does not require thick or heavy metal conductors, thin tubular-type constructions for conductors have been proposed.

A cable conductor construction currently used in the art is a thin longitudinally folded corrugated metal tape that not only provides a thin conductor but also a partial air-spaced insulation between the main and return conductors. However, this particular construction has not proven entirely satisfactory. There is a limitation as to how thin the metal conductor may be and retain sufficient strength to provide the proper depth of corrugation and resulting air-spaced insulation. Furthermore, conductors of this type are very difficult and expensive to manufacture in desirable continuous lengths. There is an additional disadvantage with regard to high frequency resistance because the current must follow the crests and troughs of the corrugations rather than a straight longitudinal path and the current path is increased. Therefore, it would be highly desirable to produce a cable construction that would provide a thin, straight, cylindrical conductor with an insulating structure sufficiently air-spaced to promote the efficient transmission of high frequency currents.

It is an object of the present invention to provide an improved cable construction having a straight, thin, cylindrical conductor. It is another object to provide a cable construction having one or more conductors comprising a thin, cylindrical, metal conductor supported on at least one side by and adhesively bonded to a layer of an olefin polymer. These and other objects, advantages, features and variations will become apparent from the following description.

In accordance with the present invention, the above and other objects are attained in an electric cable in which at least one of the concentric cylindrical conductors is a thin metal tubular cylinder bonded to and supported by at least one close-fitting olefin polymer cylinder positioned on one or both sides of the thin metal cylinder conductor. It is preferred that the thin metal conductor be bonded to the supporting olefin polymer cylinder by means of a layer of an adhesive thermoplastic material.

The invention will be more fully understood with reference to the accompanying drawings.

FIGURE 1 is a diagrammatic view of a side elevation of a short length of communication cable in accordance with the invention and from which component layers have been cut back to show more clearly the construction of the conductor.

FIGURE 2 is a diagrammatic view of a side elevation of a short length of a second example of communication cable in accordance with the invention and from which component layers have been cut back to show more clearly another construction of the conductor.

The cable of the present invention can be produced by making an inner conductor by longitudinally folding an adhesive polymer-coated metal conductor tape around a cylindrical olefin polymer core and extruding a layer of an olefin polymer over the metal tape, providing an air-spaced insulation such as by means of an open helical winding of a thick strand of polymeric material around the inner conductor, and providing an outer conductor by placing a cylindrical layer of an olefin polymer over the air-spaced insulation, longitudinally folding an adhesive polymer-coated metal conductor tape around the cylindrical olefin polymer layer, and extruding a layer of an olefin polymer over the metal conductor tape. The outer conductor can be made in a different manner by longitudinally folding the adhesive polymer-coated metal conductor tape directly over the air-spaced insulation and extruding a layer of an olefin polymer over the metal conductor tape. The temperature of the heat of extrusion is sufficient to securely bond the metal conductor tapes to the adjacent olefin polymer layers.

When making the inner conductor of a cable construction as shown in FIGURE 2, the assembly consisting of the cylindrical core 11 and thin metal conductor 12 is subjected to an external source of heat such as by passing the assembly through a heated die. The temperature of the external heat source is in the range from about 130° C. to about 200° C.

Referring again to the drawings, FIGURE 1 shows a cable construction having a cylindrical core 1, which is preferably tubular but may be solid in smaller cables, preferably composed of an olefin polymer, a thin metal cylindrical conductor 2 such as a longitudinally folded thin metal tape which has been previously coated on both sides with a thin layer of an adhesive thermoplastic polymer, a layer 3 of an olefin polymer over the metal conductor 2, and an insulating construction which is an open helical winding of a non-conducting spacing element 4, such as a thick polymer tape, a thin layer 5 of an olefin polymer over the insulating structure 4 which provides air spaces between the open helical windings and thereby provides additional insulation, a cylindrical conductor 6, such as a longitudinally folded metal tape which has previously been coated on both sides with a thin layer of an adhesive polymer, and an outer jacket 7 such as an olefin polymer jacket which provides both support for the metal conductor 6 and protection for the entire cable construction.

The adhesive-coated conductors 2 and 6 are bonded to the adjacent olefin polymer layers by means of externally applied heat such as that supplied by the heat of extrusion when extruding olefin polymer layers 3 and 7. The polymer supports, 1 and 3, for the thin metal conductor 2 makes possible the use of more expensive metals which have heretofore been excluded as possible conductor materials. The bonding of the metal conductors to the olefin polymer supports by means of the adhesive polymer permits the use of thinner, more conductive metals which provides better current transmission with the additional advantage of greater flexibility.

In a copending application Ser. No. 325,701, filed November 22, 1963, there is described a cable construction in which a cable shield is bonded to a plastic part such as an insulating or outer protective jacket. The bonded assembly comprises a thin metal conductor coated on one or both sides with a layer of a copolymer of ethylene and an ethylenically unsaturated carboxylic acid bonded to its neighboring plastic parts.

Unsupported tubular materials, such as copper tubes, are currently being used in conductor cores and must be of sufficient thickness to give the necessary support and rigidity to the inner conductor construction. However, this construction requires the use of large quantities of copper which increases the cost of construction. Furthermore, because of this cost of construction, generally only the inner conductors are constructed of copper and the outer conductors are often of less expensive materials such as aluminum.

The particular construction shown in FIGURE 1, makes possible the use of more expensive, better conducting materials such as copper in both the main and return conductors without increasing the overall cost of construction. Furthermore, since the major proportion of the cable is of a polymer construction, there is greater flexibility of the cable depending on modulus of the polymer employed.

FIGURE 2 shows a cable construction having a cylindrical core 11, which is preferably tubular but may be of solid construction in smaller cables, preferably composed of an olefin polymer, a thin metal conductor 12, such as a longitudinally folded thin metal tape which has been previously coated with a thin layer of an adhesive polymer on at least the side contacting the core 11 whereby the conductor 12 is bonded to the core 11, an insulating construction which leaves air spaces between the open helical windings of a non-conducting spacing element 13, such as a thick polymer tape, another thin metal conductor 14, such as a longitudinally folded thin metal tape which has been previously coated with a thin layer of an adhesive polymer, and an outer jacket 15 such as an olefin polymer jacket which is bonded to and supports the metal conductor 14 and protects the entire cable construction. The above construction may be altered by placing a layer of an olefin polymer between the metal conductor 12 and the insulating structure 13 similar to that of FIGURE 1.

The metal conductors in FIGURE 1 are preferably of copper; however, the outer conductor 6 may be of aluminum or other conducting metal.

In the cable of FIGURE 2, the inner conductor 12 is preferably of copper; however, the outer conductor 14 can be of either aluminum or copper or other conducting metal.

In the cable constructions of both FIGURE 1 and FIGURE 2, the insulating structures 4 and 13 respectively may be made of materials known to the art which provide the necessary air-spaced construction. The air space necessary for sufficient insulation will vary depending on the size of the cable to be constructed. Plastic air-spaced constructions providing air spaces in the range from about 1/8 inch to about 2 inches have been found to provide the necessary insulation for the present invention.

The accompanying drawings are schematic views of cables of the invention wherein the relative size of the various components in relation to one another is not to scale.

The olefin polymers employed as the preferred supporting material for the thin metal conductors are generally homopolymers and copolymers of ethlyene. The polymers are preferably those having a low dielectric constant. Where severe temperature changes are a problem, specific copolymers of ethylene are preferred. For example, a copolymer of ethylene and an ethylenically unsaturated carboxylic acid such as acrylic acid show favorable properties as to good low temperature brittleness and high stress crack resistance.

The metal conductors of the cables of the present invention are preferably pre-coated with a thin layer of an adhesive polymer. The preferred adhesive polymer used in coating the metal conductors comprises a copolymer of a major proportion of ethylene and from about 3 to about 20 percent by weight based on the copolymer of an acidic comonomer selected from $\alpha,\beta$-ethylenically unsaturated mono- and polycarboxylic acids and acid anhydrides having from 3 to 8 carbon atoms per molecule and partial esters of such polycarboxylic acids wherein the acid moiety has at least one carboxyl group and the alcohol moiety has from 1 to 20 carbon atoms. Specific examples of such acidic comonomers are acrylic acid, methacrylic acid, crotonic acid, fumaric acid, maleic acid, itaconic acid, maleic anhydride, monomethyl maleate, monoethyl maleate, monomethyl fumarate, and monoethyl fumarate.

The cable construction of this invention provides better coaxial high frequency cables since the particular construction makes possible the use of better and more expensive conductor materials in both the main and return conductors without increasing the cost of construction. The utilization of the adhesive copolymer provides a unity of cable construction which prevents components parts from collapsing where bending or other stresses are applied. Furthermore, the predominant polymer construction of the cable gives it greater flexibility and weather resistance for a wider variety of cable applications.

The following examples are illustrative of the present invention and are not intended to limit the scope thereof.

*Example 1*

A polyethylene tube having an outside diameter of 1 inch and a wall thickness of 0.050 inch is tightly wrapped with a longitudinally folded copper tape 5 mils thick. The copper tape is pre-coated on both sides with a 2 mil layer of a copolymer of ethylene and acrylic acid, said acrylic acid being present in the copolymer in an amount of about 8 percent by weight based on the copolymer. The tape is folded in a manner such that an overlap of about 1/4 inch is obtained. Over this assembly is extruded a 0.050-inch layer of polyethylene. The heat of extrusion is such that the assembly is heated to a temperature of at least 140° C. thereby bonding the copper tape to both the inner polyethylene tube and to the outer layer of polyethylene. A continuous length of superposed polystyrene tapes, having a thickness of about 1½ inches, a width of about 0.4 inch, and a helical pitch of about 4 inches is wound in an open helical manner around the extruded polyethylene layer thereby providing the insulating structure.

A 0.050 inch layer of polyethylene is extruded over the insulating structure and a copper tape 5 mils thick is longitudinally folded around said polyethylene layer with the edges overlapping about 1/4 inch. The copper tape is pre-coated on both sides with a copolymer of ethylene and acrylic acid as described above. A 0.050-inch layer of polyethylene is extruded over the copper tape, the heat of extrusion of at least 140° C. causing the copper tape to become bonded on both sides to the adjacent polyethylene layers.

*Example 2*

The procedure of Example 1 is substantially repeated except that the first extruded polyethylene layer is omitted. That is to say that the open helical winding of superposed polystyrene tape is applied directly to the copper-covered core.

*Example 3*

The procedure of Example 1 is substantially repeated except thaat the first and second extruded polyethylene layers are omitted, i.e., the open helical winding of polystyrene forming the air-gap insulation is placed directly between the thin longitudinally folded copper tape conductors in the manner shown in FIGURE 2 of the drawing.

What is claimed is:

1. An electric cable for high frequency currents composed of concentric cylindrical elements comprising inner and outer cylindrical tubular metal conductors separated by air-spaced annular insulation, at least one of the metal conductors being a thin metal tubular cylinder adhesively bonded with an adhesive thermoplastic material on at least one side to an adjacent close-fitting supporting cylindrical element of non-conducting plastic material.

2. An electric cable according to claim 1 wherein both inner and outer conductors are thin metal tubular cylinders, the inner conductor being tightly fitted around and adhesively bonded to and supported by a non-conducting cylindrical plastic core and the outer conductor being adhesively bonded to and supported by a tightly-fitting outer cylindrical non-conducting plastic jacket.

3. An electric cable according to claim 1 wherein both inner and outer conductors are thin metal tubular cylinders adhesively bonded to and supported by tightly-fitting non-conducting plastic cylinders both inside and outside of the conductors.

4. The cable according to claim 1 wherein the metal of the inner and outer tubular metal conductors is of copper.

5. The cable according to claim 1 wherein the adjacent plastic element is a layer of an olefin polymer.

6. The cable according to claim 5 wherein the olefin polymer is polyethylene.

7. The cable according to claim 1 wherein the adhesive thermoplastic material is a copolymer of ethylene and an unsaturated carboxylic acid.

8. The cable according to claim 7 wherein the adhesive thermoplastic material is a copolymer of ethylene and acrylic acid.

9. An electrical cable having an inner conductor comprising an olefin polymer core surrounded by a longitudinally folded metal tape coated on both sides with an adhesive thermoplastic polymer and another layer of an olefin polymer over the coated metal conductor; an annular air-spaced insulating means; an outer conductor comprising a cylindrical layer of an olefin polymer over the air-spaced insulating means, a metal conductor tape longitudinally folded around the cylindrical layer of olefin polymer and an outer olefin polymer jacket over the longitudinally folded metal tape, the coated metal conductors being adhesively bonded to the adjacent olefin polymer layers.

10. The cable according to claim 9 wherein the olefin polymer is polyethylene.

11. The cable according to claim 9 wherein the adhesive thermoplastic polymer is a copolymer of ethylene and acrylic acid.

12. An electric cable having an inner conductor comprising an olefin polymer core surrounded by a longitudinally folded metal tape coated on the side adjacent to the polymer core with an adhesive thermoplastic material; an annular air-spaced construction as an insulating means; a longitudinally folded metal tape surrounding said air-spaced construction, the tape being coated on the outermost side with an adhesive thermoplastic material, and an outer olefin polymer jacket, the coated metal tapes being adhesively bonded to the adjacent olefin polymer layers.

13. The cable according to claim 12 wherein the olefin polymer is polyethylene.

14. The cable according to claim 12 wherein both longitudinally folded metal tapes are copper.

15. The cable according to claim 12 wherein the adhesive thermoplastic material is a copolymer of ethylene and acrylic acid.

References Cited by the Examiner

UNITED STATES PATENTS 2,387,783  10/1945  Tawney _____ 174—131

FOREIGN PATENTS 1,157,681  11/1963  Germany.
623,730  5/1949  Great Britain.

LEWIS H. MYERS, Primary Examiner.

H. HUBERFELD, Assistant Examiner.